United States Patent [19]

Brown

[11] 4,080,927
[45] Mar. 28, 1978

[54] FLUIDIZED BED-GAS COATER APPARATUS

[75] Inventor: Lloyd C. Brown, San Diego, Calif.

[73] Assignee: General Atomic Company, San Diego, Calif.

[21] Appl. No.: 730,000

[22] Filed: Oct. 6, 1976

[51] Int. Cl.² .............................................. C23C 13/08
[52] U.S. Cl. ..................................... 118/48; 23/264; 34/57 E; 118/DIG. 5; 427/6; 427/213
[58] Field of Search .................................. 118/48–49.5, 118/DIG. 5, 308, 312; 427/21.6, 50–52, 212, 213, 248–252, 124; 176/67, 68, 91 R, 91 SP; 23/264; 34/57 A, 57 E

[56] References Cited

U.S. PATENT DOCUMENTS

| | | | |
|---|---|---|---|
| 3,215,508 | 11/1965 | Piester | 23/284 X |
| 3,251,337 | 5/1966 | Latta et al. | 118/48 |
| 3,398,718 | 8/1968 | Pilloton | 118/48 |
| 3,822,140 | 7/1974 | Gyarmati et al. | 118/DIG. 5 |
| 3,839,077 | 10/1974 | Robinson | 118/48 X |

FOREIGN PATENT DOCUMENTS 2,102,438   8/1972   Germany .......................... 427/213

Primary Examiner—Morris Kaplan
Attorney, Agent, or Firm—Fitch, Even, Tabin & Luedeka

[57] ABSTRACT

A method and multiple embodiments of apparatus for coating particles with a substance contained in a reactant gas, the particles being suspended in a fluidized bed within a coating chamber. In the method and each embodiment of the apparatus, the reactant gas is introduced into the coating chamber through an elongated nozzle closed at its upper end and including multiple lateral orifice openings for directing the reactant gas radially outwardly into the coating chamber. Means are preferably arranged about the base of the nozzle for introducing levitating gas radially and spirally outwardly into the chamber to further promote circulation of the particles and to accomplish more uniform coating.

7 Claims, 11 Drawing Figures

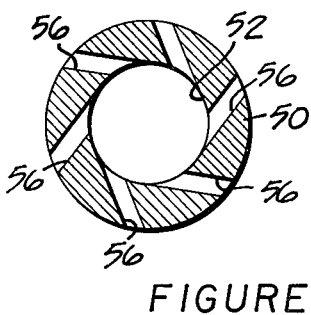
FIGURE 6.
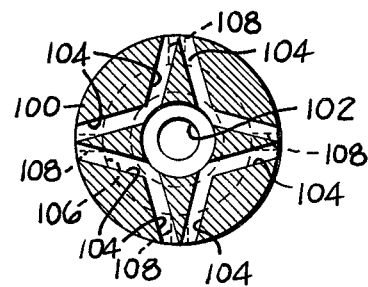
FIGURE 11.
FIGURE 5.
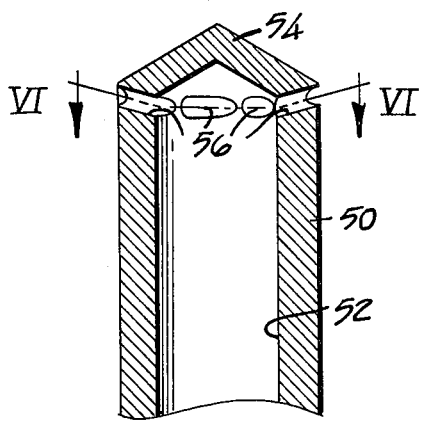
FIGURE 10.
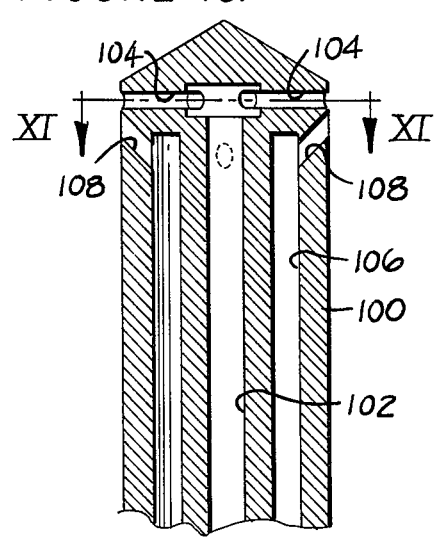
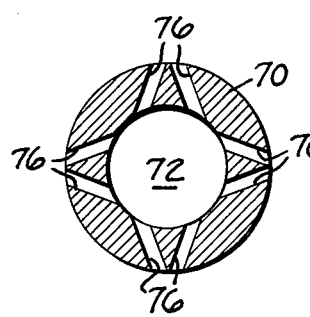
FIGURE 8.
FIGURE 7.
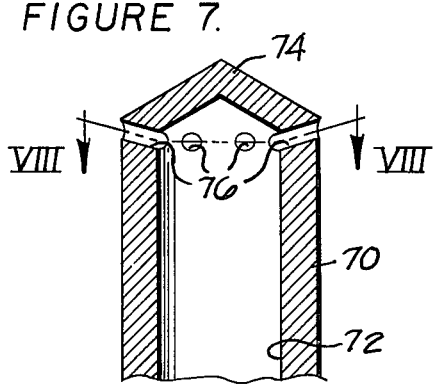
FIGURE 9.
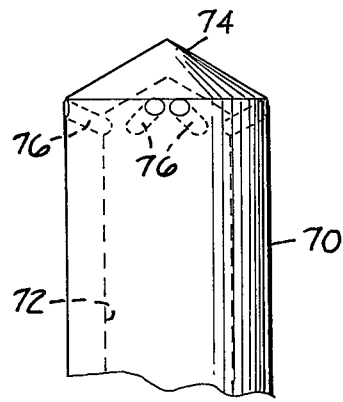

FLUIDIZED BED-GAS COATER APPARATUS

BACKGROUND OF THE INVENTION

The present invention relates to an apparatus for accomplishing the gas coating of particles suspended in a fluidized bed and more particularly to such an apparatus where the particles are dispersed and suspended in the fluidized bed by means of a levitating gas with reactant or coating gas being introduced into the fluidized bed through an elongated nozzle extending upwardly from the coating chamber floor.

It is well known in the prior art to employ gas coating within a fluidized bed for coating particles and other objects immersed in the bed. The coating may be formed by the decomposition, polymerization, condensation and/or chemical reaction of a gas, vapor or gas-vapor mixture. As a particular example of such a process, pyrolytic carbon or metallic carbides are commonly applied by such a process to provide protection for nuclear fuel particles of the type used in nuclear reactors. The fuel particles are small, for example, on the order of 500 microns, and may be formed from a suitable fissle and/or fertile material such as uranium, plutonium, thorium or suitable compounds of such materials.

Within a nuclear reactor, the nuclear fuel particles are exposed to conditions of high temperature and severe irradiation over long periods of operation. In order to assure continued effectiveness within such an environment, it has become common practice to coat the fuel particles with an impermeable material in order to retain gaseous and metallic fission products within the confines of the individual particles.

The coatings may be applied within a high temperature coating chamber through the introduction of a reactant gas having as a substantial component, or consisting entirely of, a suitable hydrocarbon such as acetylene, propylene, propane or methane. The desired coating is thus deposited through the high temperature decomposition of the hydrocarbon gas.

Examples of fuel particles provided with such coatings are disclosed and set forth for example in U.S. Pat. No. 3,325,363 issued June 13, 1967 to Goeddel et al.; U.S. Pat. No. 3,298,921 issued Jan. 17, 1968 to Bokros et al.; U.S. Pat. No. 3,361,638 issued Jan. 2, 1968 to Bokros et al.; and U.S. Pat. No. 3,649,452, issued Mar. 14, 1972 to Chin et al.

When the particles to be coated are relatively small, the coating operation may be efficiently carried out with the particles suspended in a fluidized bed within a high temperature coating chamber. The levitation or suspension of the particles within the fluidized bed may be achieved through the controlled introduction of a hydrocarbon gas, an inert carrier gas or a combination thereof into the coating chamber for dispersion through the particle bed. Most commonly, an inert carrier gas such as argon, helium, nitrogen or hydrogen is employed for this purpose.

In a coating chamber for such an operation, the particles may be dispersed and suspended by means of the inert gas in order to form a fluidized bed. A reactant gas may be introduced into the fluidized bed by means of a nozzle, the reactant gas being decomposed by high temperature within the coating chamber in order to deposit the coated material upon the particles. The various conditions for carrying out such a coating operation are well known in the prior art including temperature ranges for the coating chamber as well as rates and pressures under which both the reactive and levitating gases may be introduced as well as the duration of the coating operation.

High temperature gas coating operations of this type are relatively complex and may accordingly involve numerous problem areas which must be resolved in order to deposit uniform coatings throughout prolonged operations. Two such problem areas are particularly contemplated in connection with the present invention.

Initially, a problem arises due to introduction of the reactant gas into the high temperature coating chamber through a vertically extending nozzle which is open at its other end. A buildup of carbonaceous material, commonly referred to as "overcoating", may occur at the open end of the nozzle. This phenomenon is a particular problem since the carbonaceous overcoating on the nozzle interferes with the rate of flow for the reactant gas entering the coating chamber and also interferes with the pattern of dispersion for the reactant gas throughout the coating chamber.

An additional problem area of particular concern in relation to the present invention involves the need for maintaining uniform distribution and circulation of particles throughout the fluidized bed. These factors of uniform distribution and particle circulation are particularly important in developing uniform coatings for entire particle batches in the coating chamber.

Accordingly, there has been found to remain a substantial need for an improved method and apparatus for carrying out the gas coating of particles suspended in a fluidized bed.

SUMMARY OF THE INVENTION

It is therefore an object of the present invention to provide an improved apparatus for carrying out the gas coating of particles suspended in a fluidized bed while overcoming one or more problems of the type referred to above.

It is a more specific object of the invention to provide gas coating apparatus of this type wherein reactant gas is introduced into a coating chamber through an elongated nozzle extending into the coating chamber with the extended end of the nozzle being subject to deposition of material from the reactant gas, this deposition effect being reduced through the provision of a nozzle which is generally closed at its upper end while having a plurality of lateral openings for introducing reactant gas into the coating chamber. Such a configuration for the reactant gas nozzle tends to cause the reactant gas to penetrate into the fluidized bed of particles while minimizing the tendency for material from the reactant gas to build up on the extended end of the nozzle.

The radially outward velocity imparted to particles by the reactant gas emerging from the openings in the nozzle tends to result in a more uniform coating. In particular, the outward velocity effect promotes bulk circulation of particles through the bed with particle flow tending to follow a path outwardly from the nozzle tip, upwardly along lateral walls of the coating chamber and downwardly through an axially central portion of the coating chamber so that all of the particles in the chamber tend to experience more uniform coating.

It is an even more specific object of the invention to provide such gas coating apparatus wherein the lateral openings in the nozzle are angled upwardly in order to even further reduce overcoating of the extended end of the nozzle and to further enhance circulation of particles as described above.

Yet another more specific object of the invention is to provide additional nozzle embodiments wherein the lateral openings are designed to produce rapid dispersion of the reactant gas into the fluidized bed. One embodiment of the nozzle includes radially offset lateral openings so that the reactant gas is caused to enter the coating chamber with a swirling effect. In another embodiment, adjacent lateral openings are arranged to produce impinging jets of the reactant gas in order to accomplish more rapid dispersion thereof. In yet another embodiment, lateral openings for the reactant gas are arranged adjacent openings for another gas which is caused to impinge with the reactant gas for the same purpose set forth above. In the particular case where the second gas is an inert gas, the nozzle region which is normally susceptible to maximum buildup is thus shielded from direct contact with reactant gas to further minimize or reduce such buildup.

Even another specific object of the invention is to provide a gas coating apparatus wherein reactant gas is introduced into a coating chamber through the lateral openings in an elongated nozzle while a levitating gas is similarly introduced radially outwardly, with or without a circumferential component of velocity into the coating chamber around a lower portion of the nozzle.

Additional objects and advantages of the present invention are made apparent in the following description having reference to the accompanying drawings.

BRIEF DESCRIPTION OF THE DRAWINGS

FIG. 5 is a fragmentary, axially sectioned view of another embodiment of an extended nozzle according to the present invention.

FIG. 6 is an axial view of the nozzle of FIG. 5 taken along section line VI—VI in FIG. 5.

FIG. 7 is also a fragmentary, axially sectioned view of still another embodiment of a nozzle constructed according to the present invention.

FIG. 8 is a view of the nozzle of FIG. 7 taken along section line VIII—VIII in FIG. 7.

FIG. 9 is an unsectioned view of the nozzle of FIG. 7.

FIG. 10 is also a fragmentary, axially sectioned view of yet another embodiment of a nozzle constructed according to the present invention.

FIG. 11 is a view taken along section line XI—XI in FIG. 10.

DESCRIPTION OF THE PREFERRED EMBODIMENTS

Generally, the present invention is directed toward an apparatus for carrying out the gas coating of particles suspended in a fluidized bed. More specifically, the particles are coated with a component from a reactant gas which is introduced into the fluidized bed through an elongated nozzle extending upwardly from the floor of a coating chamber. Preferably, the particles are dispersed and suspended in the fluidized bed by means of a levitating gas.

The present invention is even more specifically directed toward the configuration of the elongated nozzle for introducing or directing the reactant gas into the coating chamber.

Gas coating apparatus according to the present invention is generally indicated at 10 in FIG. 1 and includes a coating chamber 12 having a base or floor 14. The floor 14 of the coating chamber is preferably an inverted conical member, as illustrated in FIG. 1, which is porous to permit the introduction of levitating gas into the coating chamber 12 for producing the fluidized bed of particles. However, the present invention is not limited to a coating chamber having such a cylindrical configuration or a conically shaped floor. For example, the floor 14 for the coating chamber may also be hemispherical or may even have a flat surface for example. As will be more apparent from the following description having reference to FIG. 4, the chamber floor 14 is also not limited to a porous or perforated formation. For example, the chamber floor 14 may also be solid with separate means being employed for the introduction of levitating gas.

As was indicated above, the present invention is particularly directed toward the configuration of an elongated nozzle 16, and even more specifically toward the construction and arrangement of an outlet 18 at the upper end of the nozzle for introducing reactant gas into the coating chamber 12. Various embodiments of nozzle outlets are provided with the common purpose of directing the reactant or coating gas radially outwardly to limit deposition of coating material from the reactant gas on the nozzle and to improve penetration of the reactant gas into the fluidized bed. As may be seen in FIG. 1, the nozzle outlet 18 comprises a number of circumferentially spaced apart openings or passages 20 which are in communication with an axial passage 22 in the nozzle through which reactant gas is supplied to the outlet openings. The radial arrangement of the passages 20 may be best seen in FIG. 2. Preferably, as is illustrated in FIG. 1, the openings or passages 20 are sloped upwardly in order to even further reduce deposition upon the nozzle and to further promote uniform circulation of particles through the fluidized bed.

It is noted at this point that reactant gas emerging from the outlet openings 20 imparts a radially outward velocity to particles within the fluidized bed. This outward velocity component in the particles results in a more uniform circulation of the particles within the bed and accordingly results in the application of a more uniform coating to all of the particles. Because of the outward velocity developed in the particles adjacent the nozzle, the particles tend to flow radially outwardly from the nozzle tip, upwardly along the walls of the coating chamber, then radially inwardly and down through an axially central portion of the coating chamber as may be more clearly seen in FIG. 3.

At this point, reference is made to FIG. 4 wherein another embodiment of the gas coating apparatus 10' is illustrated. The coating apparatus 10' of FIG. 4 is generally similar to that of FIGS. 1 and 3 except that levitating gas is introduced into the coating chamber through orifices 24 circumferentially spaced apart about the base of the nozzle 16. With the arrangement of FIG. 4, it may accordingly be seen that the flow of both reactant and levitating gas follows substantially the same pattern described above within the coating chamber to facilitate uniform circulation of particles throughout the fluidized bed with more uniform coating of the particles therefore being possible. The levitating gas orifices 24 of FIG. 4 may also preferably have a spiral configuration in order to impart a circumferential or swirl component of velocity to levitating gas entering the coating chamber.

Additional modifications for the nozzle outlet are illustrated in FIGS. 5–11 for further enhancing coating properties and coating efficiency. Coating efficiency is particularly contemplated here as the fraction of the total coating material from the reactant or coating gas which is actually deposited upon the particles. In general, these properties may be improved if the coating gas is rapidly dispersed across the fluidized bed after exiting the nozzle outlet 18.

The nozzle modifications of FIGS. 5–11 are thus intended to promote more rapid dispersion of the reactant gas. The embodiments of these FIGURES are described in greater detail below. However, it is generally noted that in FIG. 5, the outlet openings for the nozzle are arranged to provide a rotational component to the reactant gas, preferably by radially offsetting the outlet passages. In FIG. 7, pairs of outlet openings cause jets of the reactant or coating gas to impinge with each other in order to promote dispersion through the fluidized bed. In FIG. 10, the outlet openings for the reactant gas are coupled with outlet openings for a second gas to accomplish the same purpose described above in connection with FIG. 7. The second gas employed in the nozzle arrangement of FIG. 10 may be either an inert gas or one or more additional components of a multi-component coating gas, for example.

The features of the coating apparatus and nozzle embodiments of FIGS. 1–11 are described in greater detail below along with the preferred method of operation.

Figure 1:
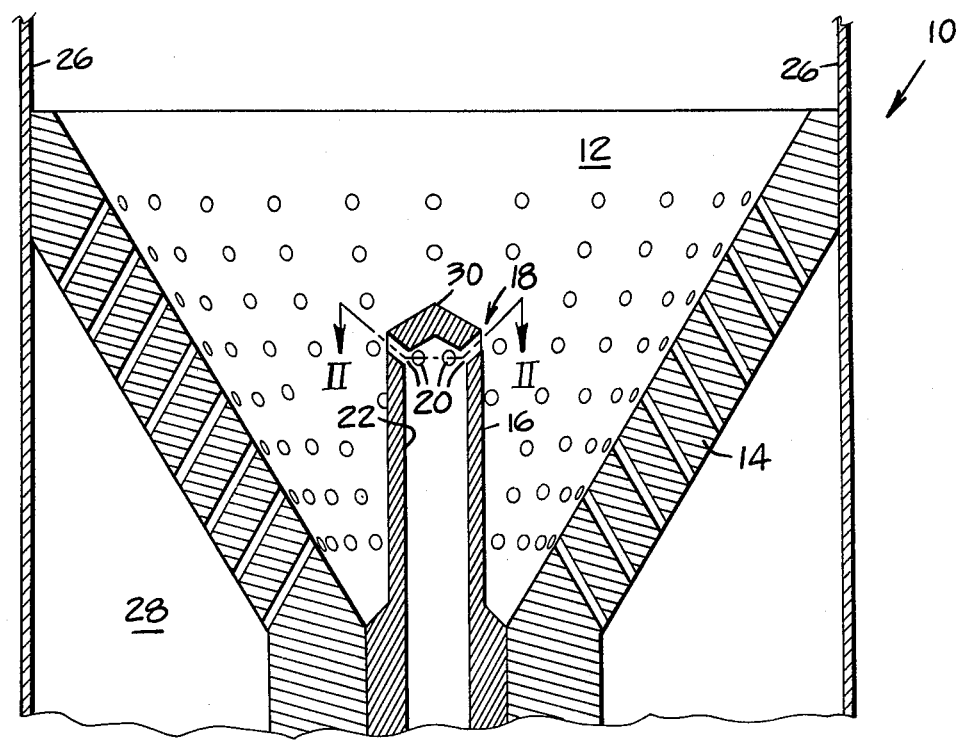
FIG. 1 is an axially sectioned view of a gas coating chamber including a reactant gas nozzle constructed and arranged in accordance with the present invention.

Referring now to FIG. 1, the coating chamber 12 may preferably be arranged within a reactor vessel including vertical walls 26, the reactor vessel being suitable for disposition within a high temperature furnace (not otherwise shown).

The inverted conical chamber floor 14 has an included angle within the general range of 30° to 140°. Preferably, the included angle of the conical floor 14 is selected within a range of approximately 45° to approximately 90°. In each of FIGS. 1, 3 and 4, the floor member is illustrated with a 60° included angle.

Figure 3:
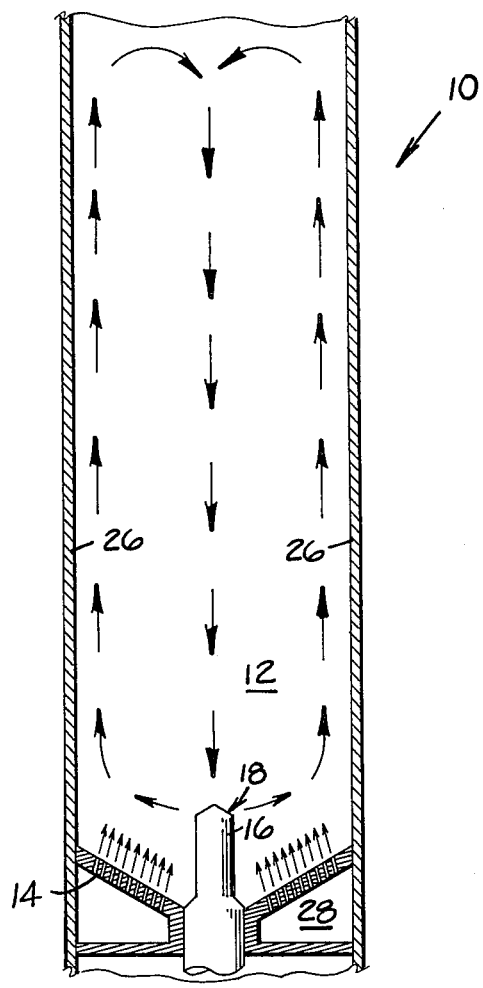
FIG. 3 is a schematic representation of a gas coating chamber illustrating particle flow developed within the coating chamber by the nozzle construction of the present invention.

Referring particularly to FIG. 3, an annular space 28 is formed beneath the conical floor 14 for receiving levitating gas. The levitating gas then penetrates upwardly through the porous floor 14 in order to suspend the particles to be coated within the chamber 12.

Figure 2:
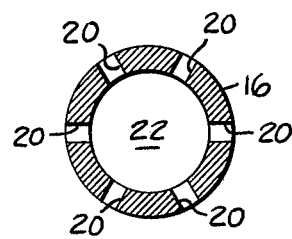
FIG. 2 is an enlarged axial view of the nozzle taken along section line II—II in FIG. 1.

Referring again to FIG. 1 and also to FIG. 2, the reactant nozzle 16 extends upwardly from the apex of the floor member 14. As was noted above, the outlet passages 20 are circumferentially spaced apart and angled upwardly so that reactant gas from the axial passage 22 exits the nozzle and flows radially outwardly and upward to promote particle circulation along the flow path illustrated in FIG. 3. It is particularly important in FIG. 1 that the upper end 30 of the nozzle is effectively closed. This feature of the nozzle is believed to be an important factor contributing to the reduced carbon buildup upon the nozzle.

Additional means may be required for supplying both reactant and levitating gas to the nozzle and the annular passage 28 respectively. Conventional means may be employed for this purpose and such features are not important to the present invention. Similarly, provision is commonly made for unloading coated particles from the chamber 12. For example, the nozzle may be mounted on a movable probe (not otherwise shown) which may be lowered to form an annular opening at the apex of the floor 14 for unloading the coated particles. Here again, this feature is not a portion of the present invention.

Figure 4:
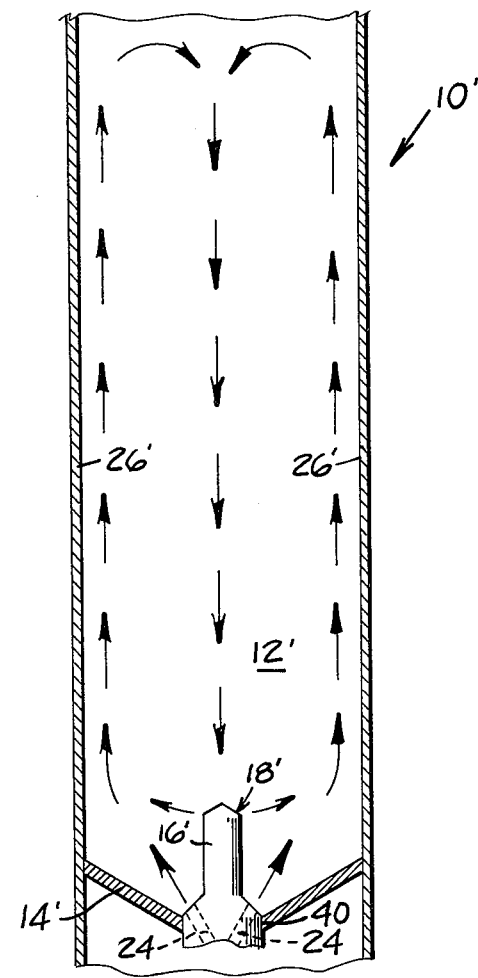
FIG. 4 is a schematic representation of a similar gas coating chamber with similar particle flow which is additionally enhanced by the radially outward introduction of levitating gas about the base of the nozzle.

Before continuing with the nozzle embodiments of FIGS. 5–11, it is noted that, in the embodiment of FIG. 4, the porous conical floor member 14 of FIG. 1 is replaced with a solid floor indicated at 14' in FIG. 4. An annular ring means 40 encompassing the base of the nozzle 16' forms the outlet orifice or passages 24 referred to above for introducing levitating gas into the coating chamber 12'. The orifices or passages 24 are formed so that the levitating gas enters the coating chamber radially, with or without a circumferential component of velocity, and generally parallel with the coating chamber floor 14'. Accordingly, the flow of both reactant and levitating gas within the coating member 12' follows the same path of circulation described above in conjunction with FIG. 3. Both the levitating and reactant gases thus tend to promote uniform circulation of the particles throughout the fluidized bed.

To describe the additional nozzle embodiments corresponding to the nozzle 16 of FIGS. 1–3, reference is initially made to FIGS. 5 and 6. In FIG. 5, the upper end of a nozzle 50 is illustrated forming an axial passage 52 which corresponds to the axial passage 22 in FIG. 1. The upper end 54 of the nozzle 50 is closed in the same manner described above for the nozzle 16. A plurality of circumferentially spaced apart outlet openings or passages 56 are formed in generally the same manner described above for the outlet openings or pasages 20 in the nozzle 16. However, the passages 56 are radially offset in order to impart a swirl effect to reactant gas which exits radially from the nozzle 50. Referring momentarily to FIG. 3, the outlet configuration for the nozzle 50 tends to additionally impart rotational motion to the particles in the fluidized bed about the vertical axis of the coating chamber. This effect is believed to even further enhance uniform circulation of particles throughout the bed with more uniform coatings being applied to the particles.

In the embodiment of FIGS. 7–9, yet another embodiment of the nozzle is indicated at 70 with an axial passage 72 and closed upper end 74. The nozzle 70 similarly includes a plurality of spaced apart openings or passages 76 which are radially offset in the manner described above for the nozzle 50. However, in the nozzle 70, adjacent pairs of opposed passages 76 are offset in opposite circumferential directions so that jets of reactant gas being directed radially outwardly through such adjacent pairs of openings or passages tend to impinge with each other. This effect has been found to improve dispersion of the reactant gas within the fluidized bed as was also discussed above. Although the reactant gas tends to be dispersed throughout the fluidized bed more rapidly, the same circulation pattern illustrated in FIG. 3 tends to be maintained for particles throughout the bed.

In FIGS. 10 and 11, yet another embodiment of a nozzle is illustrated at 100 wherein jets of reactant gas are caused to impinge with jets of a second gas for accomplishing more rapid dispersion of the gas into the fluidized bed in the same manner as described above in connection with FIGS. 7-9. In FIG. 10, the nozzle 10 includes an axial passage 102 for directing reactant gas to outlet passages 20, 56 or 76 as described above in connection with FIGS. 1, 2 and 5-9. However, the nozzle 100 also includes a second passage 106 extending along its length and concentric with the passage 102. This annular passage 106 is in communication with a second set of outlet passages 108. Each of the passages 108 is arranged adjacent one or more of the abovenoted passages 104, each set of passages 104 and 108 being further arranged to cause impingement of gases from the supply passages 102 and 106 at a point radially outwardly from the nozzle. As indicated above, one of the passages 102 and 106 supplies a reactant or coating gas while the other passage may supply either the same coating gas, an additional component of the coating gas or even an inert gas similar to the levitating gases described above.

Accordingly, there has been described a particularly effective apparatus for accomplishing the gas coating of particles suspended in a fluidized bed. Additional variations besides those described above are believed to be obvious within the scope of the present invention. For example, the angles of radial offset for the various sets of outlet orifices in the nozzles of FIGS. 5-11 may be equal or unequal. In particular, various features for the different nozzle arrangements of FIGS. 1, 2 and 5-11 may be combined with each other within the scope of the present invention. Accordingly, the scope of the present invention is defined only by the following appended claims.

What is claimed is:

1. In gas coating apparatus for coating particles with a substance contained in a reactant gas while the particles are suspended in a fluidized bed, the apparatus including means defining a coating chamber for containing the particles to be coated and a floor for the coating chamber, and gas feed means at said floor to effect said fluidization, the improvement comprising an elongated nozzle extending substantially upwardly from and centrally of the chamber floor for introducing reactant gas into the coating chamber, the nozzle being closed at its upper end, an annular portion of the nozzle adjacent its upper end forming a plurality of outwardly directed, circumferentially spaced apart outlet passages for introducing the reactant gas into the coating chamber to minimize deposition of material from the reactant gas on the upper end of the nozzle and to enhance particle distribution within the fluidized bed, said outlet passages being angled upwardly and outwardly and being radially offset with respect to any plane extending radially from the longitudinal axis of the nozzle whereby to effect swirling of the reactant gas introduced into the coating chamber.

2. The gas coating apparatus of claim 1 wherein adjacent pairs of said circumferentially spaced apart outlet passages are directed inwardly towards one another in order to produce impinging jets of the discharged reactant gas for facilitating dispersion of the reactant gas within the coating chamber.

3. The gas coating apparatus of claim 1 said nozzle further comprising a second set of circumferentially spaced apart outlet passages, one or more of said second set of passages being arranged to converge radially outwardly with one or more of said plurality of outlet passages, said elongated nozzle including means for communicating a second gas to said second set of outlet passages so that jets of said reactant gas and said second gas are impinged within the coating chamber radially outwardly from said nozzle.

4. The gas coating apparatus of claim 1 wherein said gas feed means are arranged about a lower portion of said nozzle for introducing a flow of levitating gas radially outwardly into the coating chamber for suspending the particles in the fluidized bed.

5. In gas coating apparatus for coating particles with a substance contained in a reactant gas while the particles are dispersed and suspended in a fluidized bed by means of a levitating gas, the gas coating apparatus including a generally cylindrical coating chamber for containing the particles to be coated and a floor forming a lower surface of the coating chamber, the improvement comprising an elongated nozzle extending substantially upwardly from the chamber floor and being generally centrally located thereon for introducing reactant gas into the chamber, the upper end of the elongated nozzle being closed, an annular portion of the nozzle adjacent its upper end forming a plurality of circumferentially spaced apart outlet openings of directing reactant gas from the upper end of the nozzle into the coating chamber, said openings being upwardly and outwardly directed and being radially offset with respect to any plane extending radially from the longitudinal axis of the nozzle whereby to effect swirling of the reactant gas introduced into the coating chamber, an orifice ring means being arranged about a lower portion of the nozzle and including a plurality of circumferentially spaced apart orifices for radially introducing levitating gas into the coating chamber in generally parallel flow with the coating chamber base, flow of both the levitating and reactant gases tending to promote particle movement within the fluidized bed radially outwardly and then upwardly along lateral walls of the coating chamber, then radially inwardly and downward toward the nozzle in order to maintain uniform circulation of the particles through the fluidized bed.

6. The gas coating apparatus of claim 5 wherein adjacent pairs of said circumferentially spaced apart outlet passages tend to converge outwardly in order to produce impinging jets of reactant gas for facilitating dispersion of the reactant gas within the coating chamber.

7. The gas coating apparatus of claim 5 said nozzle further comprising a second set of circumferentially spaced apart outlet passages, one or more of said second set of passages being arranged to converge radially outwardly with one or more of said plurality of outlet passages, said elongated nozzle including means for communicating a second gas to said second set of outlet passages.

* * * * *

UNITED STATES PATENT AND TRADEMARK OFFICE
CERTIFICATE OF CORRECTION

PATENT NO. : 4,080,927
DATED : March 28, 1978
INVENTOR(S) : Lloyd C. Brown

It is certified that error appears in the above-identified patent and that said Letters Patent are hereby corrected as shown below:

Column 6, line 20   "orifice" should be --orifices--.

Column 6, line 28   "member" should be --chamber--.

Column 6, line 29   "conjunction" should be --connection--.

Column 7, line 8    "10", second occurrence, should be -- 100 --.

Column 7, line 10   After "outlet" insert --openings or passages 104 which substantially conform with the outlet --.

Column 8, line 32
(Claim 5)           "of" should be --for--.

Signed and Sealed this

Seventeenth Day of October 1978

[SEAL]

Attest:

RUTH C. MASON
Attesting Officer

DONALD W. BANNER
Commissioner of Patents and Trademarks